United States Patent [19]

Mistry

[11] Patent Number: 5,054,682
[45] Date of Patent: Oct. 8, 1991

[54] METHOD OF BONDING A TOOL MATERIAL TO A HOLDER AND TOOLS MADE BY THE METHOD

[75] Inventor: Pravin Mistry, Grove, Near Wantage, United Kingdom

[73] Assignee: CMB Foodcan plc, Worcester, United Kingdom

[21] Appl. No.: 403,669

[22] Filed: Sep. 6, 1989

[30] Foreign Application Priority Data

Sep. 8, 1988 [GB] United Kingdom ............... 8821044

[51] Int. Cl.$^5$ ..................... B23K 20/00; B23K 20/22; B23K 103/16
[52] U.S. Cl. ................................ 228/194; 228/124; 228/263.12; 228/263.15
[58] Field of Search ............. 228/194, 195, 193, 122, 228/124, 263.12, 263.15; 51/309; 76/DIG. 11

[56] References Cited

U.S. PATENT DOCUMENTS

| | | | |
|---|---|---|---|
| 3,502,837 | 3/1970 | Peehs. | |
| 4,490,437 | 12/1984 | Mizuhara | 228/122 |
| 4,567,110 | 1/1986 | Jarvinen | 228/263.12 |
| 4,690,320 | 1/1987 | Morishita et al. | 228/263.15 |
| 4,762,269 | 8/1988 | Gyarmati et al. | 228/263.12 |
| 4,784,313 | 11/1988 | Godziemba-Maliszewski | 228/194 |

FOREIGN PATENT DOCUMENTS

| | | | |
|---|---|---|---|
| 0090657 | 10/1983 | European Pat. Off. . | |
| 0146024 | 6/1985 | European Pat. Off. . | |
| 2556070 | 6/1985 | France. | |
| 125673 | 7/1983 | Japan | 228/194 |
| 141681 | 7/1985 | Japan | 228/263.12 |
| 1117172 | 6/1986 | Japan | 228/122 |
| 813829 | 5/1959 | United Kingdom | 228/122 |
| 2007720 | 8/1982 | United Kingdom . | |

OTHER PUBLICATIONS

"The Solid Phase Welding of Metals", Chapter 8, R. F. Tylecote, Edward Arnold Publishers, Ltd., London, 1968.
Chemical Abstracts, vol. 109, No. 10, Sep. 5, 1988, p. 316, Abstract No. 7839y T. Narita et al: "Bonding of Silicon Nitride ($Si_3N_4$) Ceramics and an Fe-26 Cr Alloy Using Titanium Foils and a Nickel Interlayer".
Patent Abstracts of Japan, vol. 7, No. 240 (M-251) (1385), Oct. 25, 1983.
Welding International, vol. 1, No. 11, 1987, pp. 1056–1057, G. A. Shcheptina et al: "Diffusion Bonding KNT16 Tungsten Free Hard Alloy to SHKL15 Steel", Abington, Cambridge, England.
Journal of Materials Science Letters, vol. 5, 1986, pp. 1099–1100, Chapman and Hall Ltd., K. Suganuma et al: "Solid-State Bonding of Partially Stabilized Zirconia to Steel with Titanium Interlayer".
Chemical Abstracts, vol. 106, No. 20, May 18, 1987, p. 224, Abstract No. 160243s, Y. Nakajima et al.: "Diffusion Bonding Between Hard Metal and Tool Steel".

*Primary Examiner*—Sam Heinrich
*Attorney, Agent, or Firm*—Christie, Parker & Hale

[57] ABSTRACT

In a method of joining a metal matrix composite (cermet) or ceramic tool material 1 to a metallic holder 2 by diffusion bonding through an intermediate metallic layer, the tool material 1 includes at least one carbide, nitride or boride in the matrix. In one example, the tool material includes titanium carbide and titanium nitride in the metal matrix. The intermediate metallic layer is chosen from a group consisting of nickel, titanium and tungsten. The tool holder metal 2 is a ferrous alloy. The intermediate metallic layer is placed between the tool material and the metallic holder, and heat and pressure are applied for a controlled period to diffusion bond the tool material to the metallic holder. Articles made by the method include a blank holder, a punch, a die and various wear surfaces of a continuous extrusion apparatus.

18 Claims, 3 Drawing Sheets

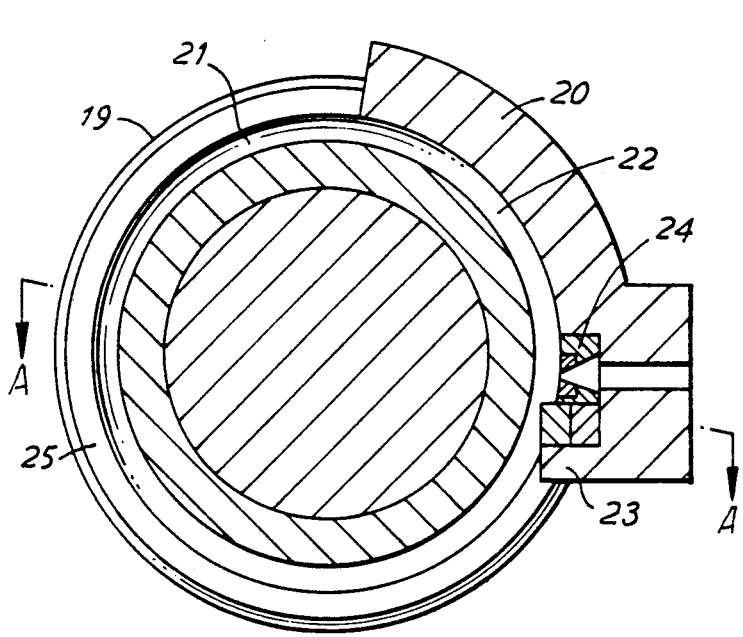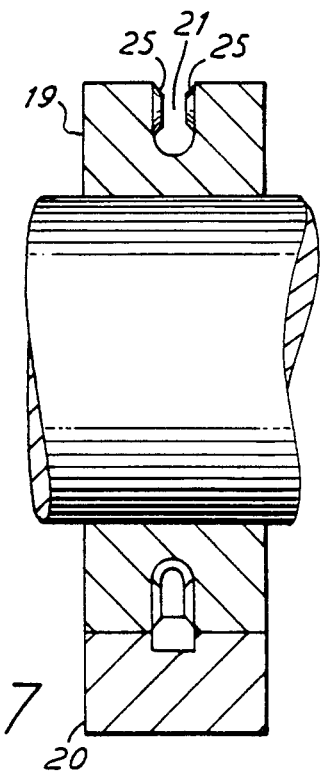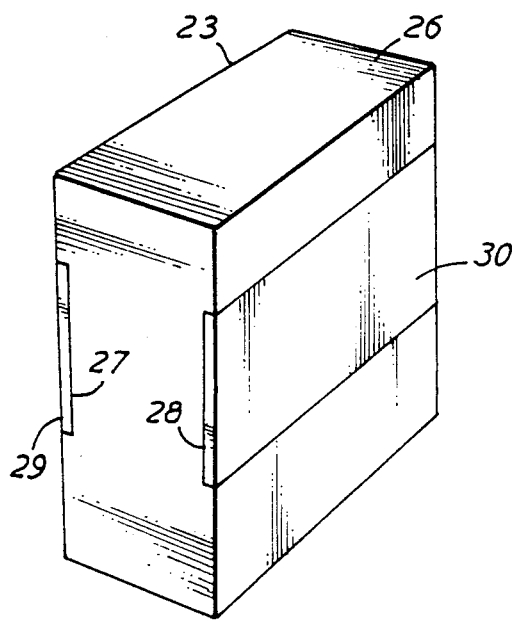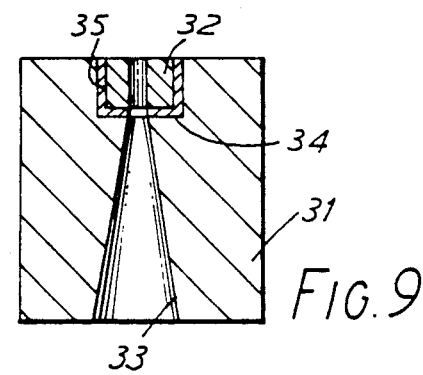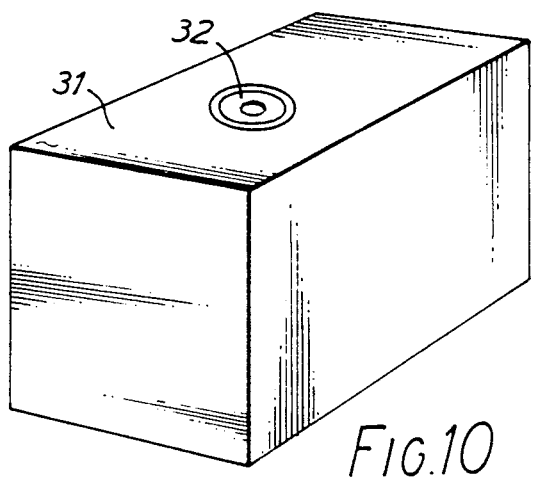

METHOD OF BONDING A TOOL MATERIAL TO A HOLDER AND TOOLS MADE BY THE METHOD

This invention relates to diffusion bonding of a tool material to a metallic holder and more particularly but not exclusively to the manufacture of tools comprising a tool material having a dispersed hard phase in a metal matrix diffusion bonded to a metallic holder such as are used for presswork.

During manufacture of cans drawn from tinplate using a cylindrical blank holder made of alloy type 650 (corresponding to alloy M2 having nominal composition 6% W; 5% Mo; 4% Cr; 2% V and 0.85% C) which exhibits useful hardness to resist abrasive wear, we observed progressive growth of an annular groove in the flat end face of the blankholder. The flat surface of the end face also exhibited abrasive and adhesive wear and scoring damage. As shown in FIG. 11, the groove "G" was created by the abrasive and adhesive effect made by the free edge of each can as it passed across the end face of the blankholder. In due course, the blankholder failed when an arcuate edge portion "F" broke off. The groove and wear damage were unacceptable because the scored surface of the end face caused surface damage to the cans. The breaking off of the arcuate edge portion was totally unacceptable. The wear to the surface of the end face also caused loss of blankholding pressure which affected the redraw operation.

While tool materials comprising titanium carbide in a ferrous matrix exhibit good resistance to abrasive wear, difficulty may be encountered in brazing the titanium carbide bearing materials to metallic tool holders if the coefficient of linear expansion differs significantly between the tool material and holder material.

Accordingly, the present invention is based on the known technique of diffusion bonding through an intermediate layer of metal placed between the tool material and tool holder metal. After application of heat and pressure for a controlled time, the tool material is bonded by interdiffusion of constituents of the tool material and/or tool holder into each other. The intermediate metal may diffuse entirely into the tool material, tool holder metal or both, so creating a tool material firmly bonded to the holder. Chapter 8 of "Solid Phase Welding of Metals" by R. F. Tylecote 1968, provides a review of the principles of diffusion bonding but does not discuss the cermet and ceramic tool materials and tool holder materials used to make the tools and wear resistant surfaces discussed herein.

The "cermet" and ceramic tool materials, subject of this invention, commonly comprise a dispersed hard phase in a matrix which may be metallic (called herein "a cermet") or ceramic (called herein "ceramic"). The hard phase may be in the form of carbides, nitrides or borides etc. which, if subjected to prolonged heating, may grow in grain size to undesirable proportions. Furthermore, some secondary carbides, nitrides or borides can decompose during diffusion bonding, and the carbon, nitrogen or boron may diffuse into a metallic tool holder and produce detrimental microstructure. For example, significant levels of carbon migrating from a tool material into a steel tool holder may raise the carbon to a level at which a persistant martensite is formed in a localised zone adjacent to the bond in the bonded article after quenching.

In a first aspect this invention provides a method of diffusion bonding a composite tool material comprising (i) titanium carbide and/or titanium diboride in a metal matrix; or (ii) titanium carbide and titanium nitride in a metal matrix; or (iii) silicon carbide or aluminum nitride in an alumina matrix; or (iv) silicon nitride or aluminum nitride in a silicon carbide matrix; or (v) silicon carbide in a silicon nitride matrix or a steel matrix to a holder material of ferrous alloy, wherein the method includes the steps of applying an intermediate layer chosen from a group consisting of nickel, titanium and tungsten and having a thickness less than 50 microns between the tool material and the holder material; and subjecting the assembly to a temperature above the melting point of the intermediate layer and to a bonding pressure of between 10 bar and 28 bar to completely diffuse the intermediate layer into the tool material and holder material to bond them together.

The benefits arising from provision of the intermediate metallic layer include:

(a) some compensation for differences of coefficient expansion between the tool material and holder metal;

(b) some degree of control of the diffusion of carbon, nitrogen or boron from the tool material to the holder metal; and (c) a bonding process which requires less time and which thereby avoids delterious agglomeration of the hard phase and/or the formation of undesirable microstructures in the tool and holder materials.

In a first embodiment, the tool material includes 28 to 35% by volume titanium carbide dispersed in a matrix of a steel containing chromium, molybdenum and nickel. In a preferred embodiment the tool material includes 8 to 15% by volume of titanium diboride or 12 to 18% of titanium nitride dispersed in the matrix.

The intermediate metallic layer may be nickel if the metallic holder is made of a steel. In which case, the nickel layer is about 10 microns thick. Alternatively, an intermediate layer of titanium is located adjacent the tool material and the nickel layer is located between the titanium layer and the metallic tool holder. In which case, the titanium layer is preferably about 2 microns thick and the nickel layer is about 8 microns thick.

It is preferable that the intermediate layer diffuses completely into the tool material or holder or both, so that, while intermediate layers up to 50 microns thick can be used, the time required for complete diffusion is increased at risk of degradation of the tool material or holder.

The intermediate metallic layer may be applied to a respective surface by electroplating or sputtering or thermal spraying. The diffusion bonding is preferably carried out at a temperature in the range 1150°–1460° C. for a period of 30–75 minutes and at an applied pressure in the range of 10–28 bar. Contact pressure, to bring the interface into functional contact, may sometimes be achieved by virtue of the weight of one component on another; light components may require provision of a recess in the holder to prevent any risk of pressure causing lateral shift when bonding pressure is applied.

In a second embodiment the tool material includes 2 to 40% by volume of silicon carbide whiskers in an alumina matrix, the intermediate metallic layer is titanium, and the metallic holder is made of a steel.

In the second embodiment, the diffusion bonding is preferably carried out at a temperature in the range 1460°–1780° C. for a period of time in the range 75–240 minutes and at an applied pressure in the range 28–45 bar.

The method may be used to create a variety of tools or articles. In a second aspect the invention provides various articles having a tool material diffusion bonded to a metallic support or holder.

In a first such article, the tool material is in the form of a cylinder, an end wall of which is bonded to an end wall of a metallic holder arranged in axial alignment with the tool material by diffusion bonding through an intermediate metal layer so that, when in use in the bonded article so produced, the bond is in cyclic compressive loading. Such loading arises in a blankholder or a redraw punch of a press tool.

In a second article, the tool material is in the form of a hollow cylinder, the interior surface of which is bonded to the exterior of a metallic holder through an intermediate layer of metal on the metallic holder so that, when in use in the bonded article so produced, the bond is in a shear mode of loading. Such loading could arise at the side wall of a drawing or redrawing punch.

In a third article, the tool material is in the form of an annulus, a peripheral surface of which is diffusion bonded to an interior surface of an annular metallic holder. If desired, the annular metallic holder may be provided with a stepped bore and the tool material is bonded to both a cylindrical surface of the bore and the annular step. Such an article could be used as a die for deep drawing, ironing, wire drawing or extrusion, or even a valve seat.

In a fourth article, the tool material is in the form of an elongate strip of coating applied to an intermediate metal layer on an elongate article and diffusion bonded thereto. This article could be the wear surface of a continuous extrusion machine or guide rail in apparatus subjected to abrasive wear.

Various embodiments will now be described by way of example and with reference to the accompanying drawings in which:

FIG. 6 is a diagrammatic sectioned side view of a continuous extrusion apparatus showing the location of a die block and an abutment;

FIG. 7 is a plan view of the apparatus sectioned on line A—A' in FIG. 6;

FIG. 8 is an enlarged perspective sketch of an abutment;

FIG. 9 is an enlarged sectional elevation of the die block of FIG. 6;

FIG. 10 is a perspective sketch of the die block of FIG. 6; and

Figure 1:
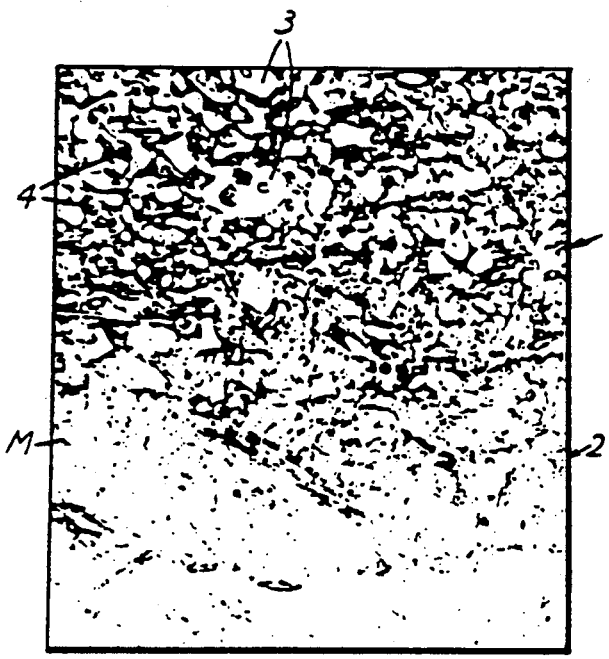
FIG. 1 is a micrograph, at ×1500 magnification, showing a heterogenous interface between a titanium carbide containing tool material and an alloy steel holder after diffusion bonding.
Figure 11:
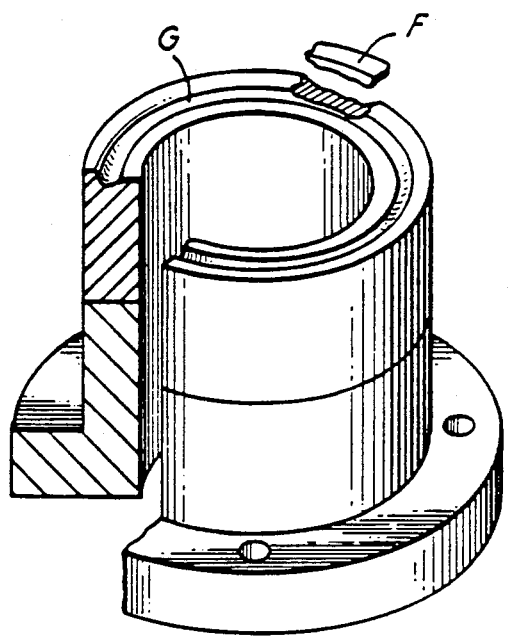
FIG. 11 is a perspective sketch of a prior art blankholder after failure.

FIG. 1 shows a tool material 1 after direct diffusion bonding to an alloy steel holder 2. The tool material 1 comprises titanium carbide, visible as large dark grains such as denoted at 3, and titanium diboride, visible as smaller rounder grains such as denoted at 4, in a matrix of an alloy steel initially having about 0.85% carbon. The alloy steel holder was made of alloy type 420, having between 0.17 and 0.22% carbon and between 12 and 14% chromium.

FIG. 1 shows that, during the period of heating and under the pressure applied for developing a diffusion bond, some titanium carbide and titanium diboride have grown in grain size and segregated to form a coarse "heterogeneous" texture in the interface between the tool material and the holder; and carbon from the tool material has migrated into the alloy steel holder establishing a carbon content giving rise to a brittle martensite structure M adjacent the interface.

The structure shown in FIG. 1 is less than ideal for use in joining tool material tips to holders of press tools for the following reasons:

1. The direct bonding of tool material to holder metal is unable to allow for differences in the thermal coefficients of expansion of the tool material and tool holder.

2. The growth of the titanium carbide and diboride is at the expense of carbon in the matrix of the tool material which is therefore softened.

3. The coarse and heterogeneous structure is vulnerable to cyclic fatigue loading.

4. The martensite (high local carbon gradient) structure induced in the tool holder is undesirable because it is brittle and lacks ductility.

Figure 2:
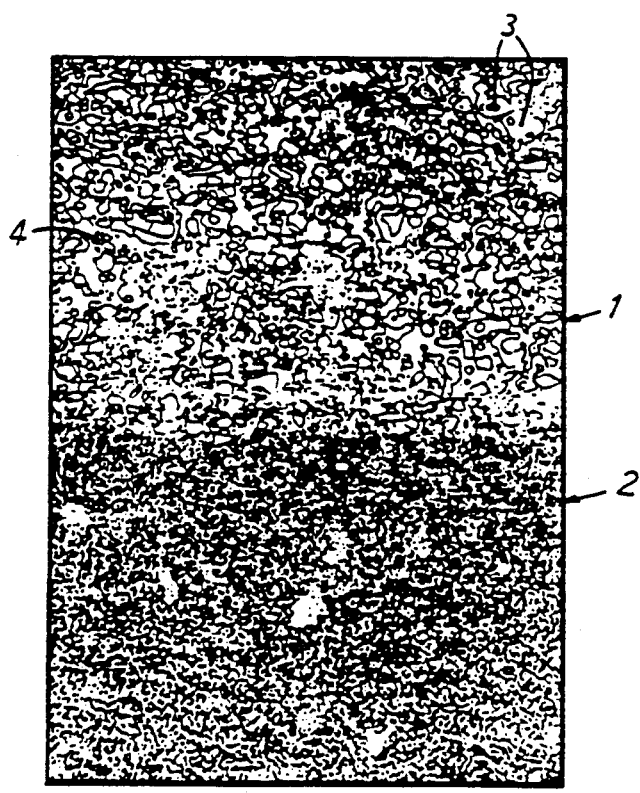
FIG. 2 is a micrograph, at ×1500 magnification, showing the improved interface arising when tool material and alloy steel of FIG. 1 are diffusion bonded through an intermediate layer of metal.

In contrast, FIG. 2 shows the same tool material bonded to the same tool holder metal as used to create FIG. 1 but the diffusion bond was made through an intermediate layer of metal, such as nickel, which has diffused into both the tool material and tool holder metal leaving the interface between the tool material and the holder free of deleterious grain growth and leaving the holder free of martensite adjacent the interface.

In the belief that the intermediate layer of nickel has acted to control migration of carbon from the tool material to the tool holder material, various possible pairs of tool material and metallic holder material have been considered as tabulated:

TABLE

| Example No. | 1 | 2 | 3 | 4 | 5 |
|---|---|---|---|---|---|
| Tool material/matrix | TiC in Cr Mo Ni steel | TiC & TiB$_2$ in Cr Mo Ni steel | TiC & TiN in Cr Mo Ni steel | SiC in type 420 steel | AlN$_2$ or silicon carbide in Alumina |
| Intermediate metal layer(s) | Nickel (10 μm) | Titanium (2 μm) Nickel (8 μm) —or Tungsten (8 μm)— | Titanium (2 μm) Nickel (8 μm) | Titanium (5 μm) | Titanium (10 μm) |
| Metallic holder | Type 410 stainless steel | Type 420 steel | Type 420 steel | Carbon steel | Type 420 steel |

In each example the intermediate metal layer acts to prevent deleterious migration of carbon, nitrogen, or boron into the holder metal so that the tool material is not significantly depleted of these elements. Not wishing to be limited to any explanation, we think the mechanism may be that the intermediate metal either becomes saturated to prevent carbon migration or alternatively reacts to form carbides or nitrides. Either way, at the end of the diffusion bonding, the intermediate layer of metal is no longer visible as would be a brazing metal. The same principles will apply to tool materials comprising silicon nitride in a silicon carbide matrix or silicon carbide in a silicon nitride matrix or aluminum nitride in a silicon carbide matrix.

By way of example, a material specification for the tool material, intermediate metallic layers and holder metal of Example 2 is as follows:

A) TOOL MATERIAL

| | |
|---|---|
| Titanium Carbide (Primary hard phase) | 28 to 38% by volume |
| Titanium diboride (hard dispersion phase) | 8 to 15% by volume with a grain size less than 3 microns |

Matrix metal: iron carbon 0.55%; chromium 8%; Molybdenum 4%; Nickel 1.75%; Boron 1.5%; Vanadium 0.7 to 0.9%; Copper less than 0.3%.

Note: Titanium diboride may be replaced for some applictions by titanium nitride in the range 12 to 18% by volume as tabulated above as Example 3.

In both cases, a uniform distribution of the hard phases in the matrix is desirable. Porosity levels on the ASTM scale should preferably be Ao. There should be less than 1% agglomeration of the titanium carbide.

The mechanical properties of the tool material of Example 2 are:

| | |
|---|---|
| Tensile strength | 1925 N/mm$^2$ |
| Elastic modulus | 290 N/mm$^2$ |
| Compressive strength | 4200 N/mm$^2$ |
| Bending strength | 1780 N/mm$^2$ |
| Coefficient of thermal Expansion (20° C.) | 7.2 × 10$^{-6}$ m/m °C. |
| Specific weight | 6.8 g/cm$^3$ |

B) METALLIC INTERMEDIATE LAYERS

Metal cermet bond surface: titanium (2 μm) + nickel (10 μm).

Steel substrate bond surface: nickel (8 μm).

In comparison with Example 2 tabulated above, there is an additional layer of nickel, 10 microns thick, on the cermet bond surface. The nickel intermediate layers control carbon diffusion to avoid brittleness.

The titanium enchances diffusion bias to metal cermet or ceramic matrix. Acceptable levels of grain growth at bond layers of less than 2% within a zone 1 mm from diffusion centre line are achieved as shown in FIG. 2.

C) STEEL HOLDER METAL

While all the stainless steel types mentioned are suitable for forming bonds by diffusion bonding, for the majority of applictions type 420 stainless steel is preferred due to the following:
 (i) High tensile/fracture toughness properties
 (ii) Suitable thermal expansion properties
 (iii) Reduced intergranular corrosion sensitivity

| Material Type 420: Specification: | |
|---|---|
| (i) Chemical Composition | |
| C 0.17–0.22%; Cr 12–14%; remainder Fe | |
| (iia) Mechanical Properties (annealed condition) | |
| Tensile strength | <750 N/mm$^2$ |
| Brinell hardness | <220 HB |
| (iib) Mechanical Properties (hardened and tempered conditions) | |
| 0.2% yield point | 520 N/mm$^2$ |
| Tensile strength | 900 N/mm$^2$ |
| Elongation (longitudinal) | 15% |
| Elongation (transverse) | 13% |
| Notch Impact Toughness (longitudinal) | 38 J (minimum) |
| Notch Impact Toughness (transverse) | 28 J (minimum) |
| Brinell Hardness | 275 HB |
| (iii) Physical Properties | |
| Density | 7.8 g/cm$^3$ |
| Modulus of Elasticity | 216 × 10$^3$ N/mm$^2$ at 20° C. |
| Thermal conductivity | 30 J/m °C. at 20° C. |
| Specific Heat | 0.46 J/g °C. at 20° C. |
| Thermal Expansion | 20–100° C. 10.5 × 10$^{-6}$ m/m °C. |
| | 200° C. 11.0 × 10$^{-6}$ m/m °C. |
| | 400° C. 12 × 10$^{-6}$ m/m °C. |
| | 500° C. 12 × 10$^{-6}$ m/m °C. |
| Electrical Resistitivity at 20° C. | 0.55 ohm mm$^2$/m |

The method of diffusion bonding according to Example 2 gave rise to the microstructure shown n FIG. 2. The method comprised the steps of:

1. providing a piece of tool material consisting of titanium carbide and titanium diboride dispersed in the metal matrix specified above, machining a surface of the tool material to a flat shape, and applying a layer of titanium 2 microns thick and a layer of nickel 10 microns thick to the surface;

2. providing a metallic holder of type 420 steel, making a flat surface upon it and applying a layer of nickel 8 microns thick to the surface;

3. bringing together the surface layers of nickel;

4. applying a pressure of about 25 bar while the assembled tool material, intermediate layers, and metallic holder are heated to 1180° C. and held at this temperature for 30 minutes; and 5. removing the heat and pressure, and allowing the bonded structure to cool in a vacuum furnace.

Figure 3:
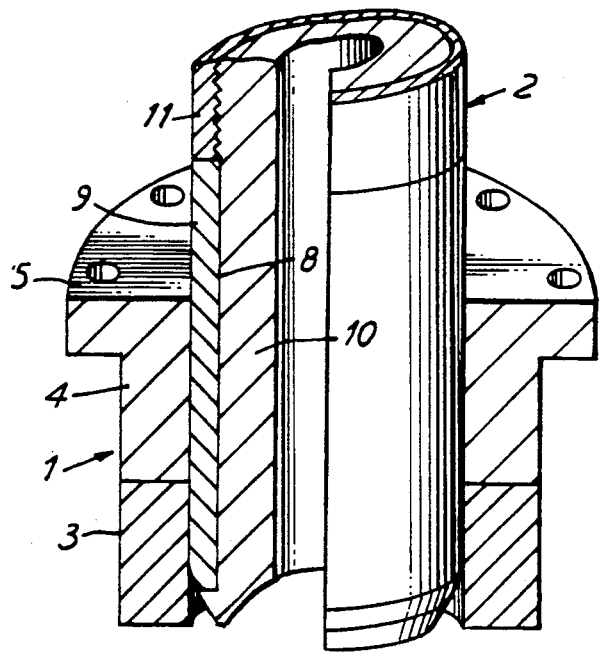
FIG. 3 is a sectioned side view of a blankholder and punch.

This method has been successfully used to manufacture the blankholder, shown in FIG. 3, and now undergoing prolonged trials which to date are satisfactory.

In step 1, the layer of nickel 10 microns thick may be omitted. Where this layer is omitted, in step 3 the surface layers of titanium and nickel are brought together.

Heat Treatment of Compound Sintered/Diffusion Bonded Blanks

The period of heat required for diffusion bonding the tool material/ceramic to the steel substrate produces annealed (soft) microstructure. The following heat-treatment is carried out prior to finish manufacture and service for both titanium diboride (Example 2) and titanium nitride (Example 3) dispersion strengthened materials.
 1) Rough machine
 2) Stress relief 600°–650° C., furnace cool
 3) Finish machine
 4) Vacuum harden 1090°–1098° C., pressure quench
 5) Temper 520° C. for a minimum of one hour.

This treatment gives rise to a metal-ceramic hardness 68/72 HRC and a microstructure consisting of titanium carbide phase with dispersant of titanium diboride and titanium nitride in a steel matrix.

The steel substrate has then a hardness 275 HB at the minimum and a microstructure consisting of some dispersion of chrome carbides with tempered martensite matrix.

Figure 4:
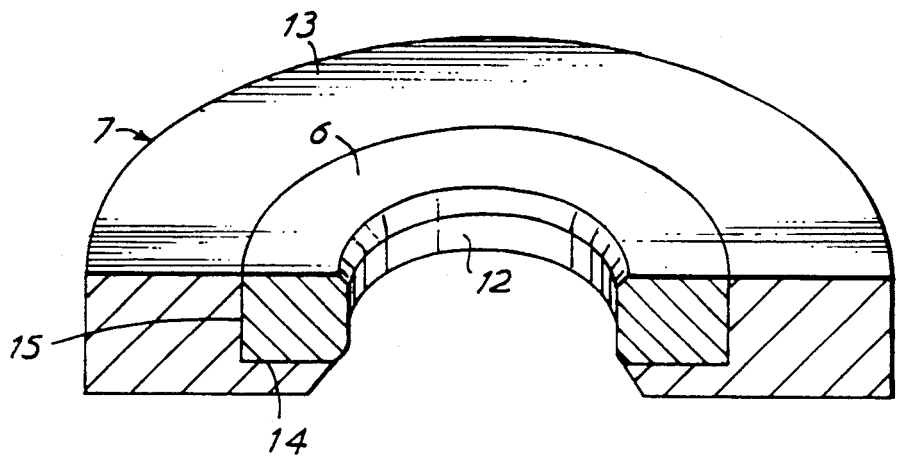
FIG. 4 is a perspective view of a drawing die sectioned on a diameter.
Figure 5:
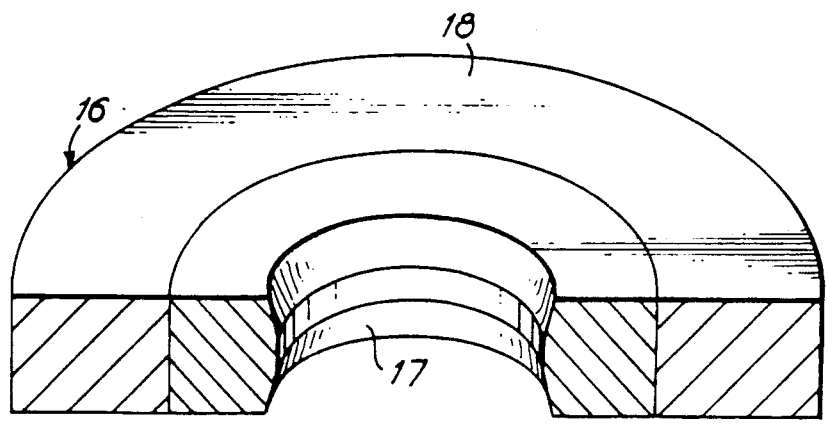
FIG. 5 is a perspective view of a wall ironing die sectioned on a diameter.

FIGS. 3, 4 and 5 of the drawings viewed together show how the diffusion bonding method can be used to make press tools reinfoced at strategic positions by inclusion of harder tool materials.

In FIG. 3, a tubular blankholder 1 surrounds a cylindrical punch 2. The tubular blankholder has an annulus 3 of tool material, comprising a dispersion of titanium carbide and titanium boride in a metal matrix (such as set out in Example 2) and a shank 4 made of type 420 steel. The metal shank has a flange 5 at one end for fixing to a press ram. The other end of the shank is in axial alignment with the annulus of tool material and is diffusion bonded to the tool material in the manner already described. When in use in a press, the annulus 3 presses the workpiece against the top face 6 of the draw die 7 shown in FIG. 4.

The punch 2 shown in FIG. 3 is a hollow cylinder 10 having an annular recess around its external surface in which is fitted a sleeve 9 of harder tool material. The tool material, which may be according to any of Example 1 to 5, is diffusion bonded to the exterior of the hollow cylinder 10. When in use, the punch slides in the blankholder so that wear forces received by the tool material impose a shearing force on the bond. As shown in FIG. 3, the shearing forces can be reduced by making the ends of the recess support a compressive thrust load. A collar 11, or other removable means, may be provided to facilitate initial fitting of the sleeve of tool material.

FIG. 4 shows a drawing die 7 in which the tool material is in the form of an annulus 12, the peripheral surface of which is diffusion bonded to an interior surface of an annular metal holder 13. In FIG. 4, the metal holder has a stepped bore. In use, the bond is in compression at an annular ledge 14 so that minimal shearing force is applied to the cylindrical bond 15. The material of any of Examples 1 to 5 may be applied to this drawing die.

FIG. 5 shows a wall ironing die 16 which comprises an annulus of tool material 17 located in a bore in a metal holder and diffusion bonded thereto. As the loads arising in corrective ironing (i.e. less than 10% reduction of workpiece thickness) are relatively small, a bond in shear mode of loading may suffice.

FIG. 6 shows, diagrammatically, a continuous extrusion apparatus comprising a wheel 19 mounted for rotation in contact with a fixed shoe 20. The wheel has a peripheral groove 21 closed along an arc of the circumference by the shoe 20 to define a passageway 22 blocked by an abutment 23. Material fed into the passageway is driven, by frictional engagement with the groove, to compression at the abutment where it is extruded through a die 24. Considerable wear forces arise at the sides of the groove 21 and the die 24 so that it is desirable to make these surfaces of wear resistant material.

In FIGS. 6 and 7, a pair of annuli 25 of tool material have been diffusion bonded to the wheel material so that, when in use, the bond is linear and subjected to a shearing force as the abutment is passed.

FIG. 8 shows a replaceable abutment 23 insert in the form of a rectilinear block 26 of steel having, on opposed sides, recesses 27, 28 in which tool material 29, 30 is diffusion bonded. In use, the bond is in a shear mode of loading but some of the resolved direction of shear is supported by the edges of each recess.

FIGS. 9 and 10 show a die block 31 into which has been diffusion bonded a die pellet 32. A bore in the block comprises a frustoconical exit 33, a ledge 34 and a cylindrical mouth 35. The die pellet is bonded to the cylindrical mouth and ledge so that the loading, when is use, is predominantly compressive.

I claim:

1. A method of diffusion bonding a composite tool material comprising
   (i) titanium carbide and/or titanium diboride in a metal matrix; or
   (ii) titanium carbide and titanium nitride in a metal matrix; or
   (iii) silicon carbide or aluminum nitride in an alumina matrix; or
   (iv) silicon nitride or aluminum nitride in a silicon carbide matrix; or
   (v) silicon carbide in a silicon nitride matrix or a steel matrix to a holder material of ferrous alloy, wherein the method includes the steps of applying an intermediate layer chosen from a group consisting of nickel, titanium and tungsten and having a thickness less than 50 microns between the tool material and the holder material; and subjecting the assembly to a temperature above the melting point of the intermediate layer and to a bonding pressure of between 10 bar and 28 bar to completely diffuse the intermediate layer into said tool material and holder material to bond them together.

2. A method according to claim 1, wherein the tool material is in the form of a hollow cylinder, the interior surface of which is bonded to the exterior of a metallic holder through an intermediate layer of metal on the metallic holder so that, when in use in the bonded article so produced, the bond is in a shear mode of loading.

3. A method according to claim 1, wherein the tool material is in the form of an annulus, a peripheral surface of which is diffusion bonded to an interior surface of an annular metallic holder.

4. A method according to claim 2, wherein the metallic holder is provided with a stepped cylindrical bore forming an annular step and the tool material is bonded to both a cylindrical surface of the bore and the annular step.

5. A method according to claim 1, wherein the tool material is in the form of an elongate strip or coating applied to an intermediate metal layer on an elongate metal article and diffusion bonded thereto.

6. A method of diffusion bonding a composite tool material to a holder material, the composite tool material comprising titanium carbide and titanium diboride in a steel matrix and the holder material comprising steel, wherein the method includes the steps of applying an intermediate layer comprising a layer of nickel and a layer of titanium and having a thickness of less than 50 microns between the tool material and the holder material to form an assembly, and subjecting the assembly to a temperature above the melting point of the intermediate layer and to a bonding pressure of between 10 bar and 28 bar to completely diffuse the intermediate layer into the tool material and holder material to bond them together.

7. A method according to claim 6 wherein the tool material includes 28% to 35% by volume of titanium carbide and 8% to 15% by volume of titanium diboride.

8. A method of diffusion bonding a composite tool material to a holder material, the composite tool material comprising titanium carbide and titanium nitride in a steel matrix and the holder material comprising steel, wherein the method includes the steps of applying an intermediate layer comprising a layer of nickel and a layer of titanium and having a thickness of less than 50 microns between the tool material and the holder material to form an assembly, and subjecting the assembly to a temperature above the melting point of the intermediate layer and to a bonding pressure of between 10 bar and 28 bar to completely diffuse the intermediate layer into the tool material and holder material to bond them together.

9. A method according to claim 8 wherein the tool material includes 28% to 35% by volume of titanium carbide and 12% to 18% by volume of titanium nitride.

10. A method according to claim 6 or claim 8 wherein the titanium layer is 2 microns thick and the nickel layer is 8 microns thick.

11. A method according to claim 6 or claim 8 wherein the diffusion bonding is carried out at a temperature in the range 1180° to 1460° C. for a period of 30 to 75 minutes.

12. A method according to claim 6 or claim 8 wherein the tool material is in the form of a hollow cylinder, an end wall of the tool material being bonded to an end wall of the holder material arranged in axial alignment with the tool material by diffusion bonding through the intermediate layer to form a blank holder, whereby, in use in the blank holder so produced, the bond is in cyclic compressive loading.

13. A method of diffusion bonding a composite tool material to a holder material, the composite tool material comprising silicon carbide in a steel matrix and the holder material comprising steel, wherein the method includes the steps of applying an intermediate layer comprising a layer of titanium and having a thickness of less than 50 microns between the tool material and the holder material to form an assembly, and subjecting the assembly to a temperature above the melting point of the intermediate layer and to a bonding pressure of between 10 bar and 28 bar to completely diffuse the intermediate layer into the tool material and holder material to bond them together.

14. A method according to claim 13 wherein the intermediate layer of titanium has a thickness of 5 microns.

15. A method of diffusion bonding a composite tool material to a holder material, the composite tool material comprising silicon carbide in an alumina matrix and the holder material comprising steel, wherein the method includes the steps of applying an intermediate layer comprising a layer of titanium and having a thickness of less than 50 microns between the tool material and the holder material to form an assembly, and subjecting the assembly to a temperature above the melting point of the intermediate layer and to a bonding pressure of between 28 bar and 45 bar to completely diffuse the intermediate layer into the tool material and holder material to bond them together.

16. A method according to claim 15 wherein the intermediate layer of titanium has a thickness of 10 microns.

17. A method of diffusion bonding a composite tool material to a holder material, the composite tool material comprising titanium carbide in a steel matrix and the holder material comprising steel, wherein the method includes the steps of applying an intermediate layer comprising a layer of nickel and having a thickness of less than 50 microns between the tool material and the holder material to form an assembly, and subjecting the assembly to a temperature above the melting point of the intermediate layer and to a bonding pressure of between 10 bar and 28 bar to completely diffuse the intermediate layer into the tool material and holder material to bond them together.

18. A method according to claim 17, wherein the intermediate layer of nickel has a thickness of 10 microns.

* * * * *

UNITED STATES PATENT AND TRADEMARK OFFICE
CERTIFICATE OF CORRECTION

PATENT NO. : 5,054,682

DATED : October 8, 1991

INVENTOR(S) : Pravin Mistry

It is certified that error appears in the above-identified patent and that said Letters Patent is hereby corrected as shown below:

```
Column 2, line 29, change "delterious" to
          -- deleterious --.
Column 5, line 29, change applictions" to
          -- applications --.
Column 5, line 56, change "enchances" to -- enhances --.
Column 5, line 64, change "applictions" to
          -- applications --.
Column 6, line 20, change "30 J/m °C." to -- 30 J/m°C --.
Column 6, line 21, change "0.46 J/g °C." to
          -- 0.46 J/g°C --.
Column 6, line 29, after "shown" change "n" to -- in --.
Column 7, line 11, change "reinfoced" to -- reinforced --.
Column 7, lines 28,29, change "Example 1 to 5" to
          -- Examples 1 to 5 --.
Column 8, line 11, after "when" delete "is" and insert
          -- in --.
```

UNITED STATES PATENT AND TRADEMARK OFFICE
CERTIFICATE OF CORRECTION

PATENT NO. : 5,054,682

DATED : October 8, 1991

INVENTOR(S) : Pravin Mistry

It is certified that error appears in the above-identified patent and that said Letters Patent is hereby corrected as shown below:

Column 9, line 15, after "point" change "ofthe" to -- of the --.

Signed and Sealed this

Twenty-third Day of March, 1993

Attest:

STEPHEN G. KUNIN

*Attesting Officer*     *Acting Commissioner of Patents and Trademarks*